United States Patent Office 3,372,209
Patented Mar. 5, 1968

3,372,209
DIPHOSPHORUS ESTER HYDROCARBON DIOLS
Gail H. Birum, Kirkwood, and Rodney B. Clampitt, St. Louis, Mo., assignors to Monsanto Company, St. Louis, Mo., a corporation of Delaware
No Drawing. Filed Aug. 24, 1964, Ser. No. 391,726
18 Claims. (Cl. 260—932)

ABSTRACT OF THE DISCLOSURE

Phosphorus hydrocarbon diols of the formula

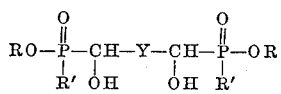

are useful as reactive flame retarding components in polymers such as polyesters, polyurethanes and polyethers. In the foregoing formula each R is an alkyl of 1 to 12 carbon atoms or a chloroalkyl or bromoalkyl of 2 to 12 carbon atoms while each R' is an alkyl or alkoxy having 1 to 12 carbon atoms or chloroalkoxy or bromoalkoxy having 2 to 12 carbon atoms or phenyl and Y is alkylene having 2 to 10 carbon atoms or phenylene. The new diols are produced by reacting a dialdehyde with a phosphite or phosphonite ester and water or a non-oxidizing mineral acid or mixtures of the two at a temperature from about −25 to about 125 degrees centigrade.

---

This invention relates to hydocarbon diol compounds. More particularly this invention provides new hydrocarbon diols having pentavalent phosphorus esters as substituents therein.

Organic phosphorus esters have been used for some time as plasticizers, and as flame retarding additives in various polymeric systems. They are relatively inexpensive, are readily available, and provide a relatively easy way to provide compounds having at least two types of the most effective flame-retarding elements in one compound, namely, phosphorus and halogen. Some phosphine oxides have been found useful for flame-retarding applications, for example, in polyurethane, polyester, and polyacrylate compositions. However, the phosphine oxides are not only expensive but are difficult to halogenate in an economical manner. Attempts have recently been made to "build in" or incorporate into the polymer chain or backbone a reactive phosphorus containing moiety by use of reactive phosphorus ester compounds. However, the ester linkages of the phosphorus tend to hydrolyze or break up, thereby degrading the polymer structure into which they have been put. It is desirable to find economical ways to chemically bond phosphorus esters to polymer systems so that the phosphorus will not degrade the polymer.

By this invention there is provided an economical means for incorporating phosphorus ester groups into polymer compositions. This invention provides novel organic phosphorus ester-containing hydrocarbon diols which are especially useful as reactive flame retarding components in polyethers, polyesters, and polyurethane compositions.

One aspect of this invention provides phosphorus ester containing hydrocarbon diols of the formula

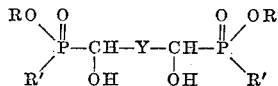

wherein each R is selected from the group consisting of alkyl having from 1 to about 12 carbon atoms, chloroalkyl and bromoalkyl having from 2 to about 12 carbon atoms in each of such moieties, each R' is selected from the group consisting of alkyl and alkoxy having from 1 to about 12 carbon atoms in each of such moieties, chloro and bromoalkoxy having from 2 to about 12 carbon atoms and phenyl, and Y is bivalent and is selected from the group consisting of alkylene having from 2 to about 10 carbon atoms and phenylene.

Another aspect of this invention provides an economical process for preparing compounds of the above type from readily available commercial chemicals. By this process, a dialdehyde (a) is combined with a member of the group consisting of (b) a reactant selected from the group consisting of water, a non-oxidizing mineral acid and acids resulting from mixing water and the non-oxidizing mineral acid and (c) a phosphite or phosphonite ester, with the proviso that the dialdehyde compound reactant (a) has combined therewith the other member of said group of reactants (b) and (c). The dialdehyde reactant is one having a formula

wherein Y is as defined above. The non-oxidizing mineral acid reactant (b) is herein defined as hydrogen chloride, hydrogen bromide, or a sulfur or phosphorus acid. The acid members of reactants (b) are either hydrochloric acid, hydrobromic acid, sulfuric acid, sulfonic acids, or phosphoric acid, but is preferably hydrochloric acid or hydrobromic acid. The phosphite or phosphonite ester reactant (c) has the formula

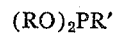

wherein R and R' are as defined above.

For efficient operation of the process, the three reactants should be contacted in substantially stoichiometric proportions. A small excess of the phosphorus ester reactant (c) may be helpful in some cases to ensure completion of the reaction.

In conducting the process of this invention, the order in which the three reactants are combined has a substantial influence on the conversion of the reactants and on the yield of the desired phosphorus ester-containing hydrocarbon diol product. In the process of this invention we have found that the best results are obtained by combining the dialdehyde compound (a), admixed with either the reactant (b) or the trivalent phosphorus ester (c) with the third reactant. It is not desirable to add the dialdehyde compound (a) to a mixture of the reactant (b) and the trivalent phosphorus ester (c). A preferred method for conducting the process is to add the reactant (b) to a mixture of the dialdehyde compound (a) and the trivalent phosphorus ester (c). However, it is within the scope of the invention to combine the trivalent phosphorus ester reactant (c) with a mixture of the dialdehyde compound (a) and the reactant (b). If this latter alternative is used, it is preferred that the dialdehyde compound (a) and the reactant (b) be combined just prior to combining this resulting mixture with the trivalent phosphorus ester to minimize possible side reactions between the reactant (b) and the dialdehyde compound. It is also within the scope of the invention to add all three reactants to the reaction vessel simultaneously providing that there is present an excess of the dialdehyde compound reactant. When the particular chosen combination of the dialdehyde compound, reactant (b) material, and the trivalent phosphorus ester reactants includes reactant (b) materials and dialdehyde reactants which may lead to side reactions, for efficient operation the process should be conducted according to the above mentioned preferred method of adding the reactant (b) to a mixture of the selected dialdehyde compound (a) and the trivalent phosphorus ester (c).

The process of the invention may be conducted by combining the dialdehyde compound (a), the reactant (b) and the trivalent phosphorus ester (c) at a temperature range of about 0° C. to about 125° C. Lower temperatures may be useful when the lower molecular weight reactants, particularly the lower alkylene dicarboxaldehydes and the lower alkyl trivalent phosphorus esters are used, but for the higher molecular weight reactants, such low temperatures cause reaction to proceed more slowly than is desired in most cases. Temperatures much higher than those stated may not be desired for most combinations or reactants because they tend to cause deleterious side reactions. For most combinations of reactants, it is preferred to conduct the process at temperatures on the order of about 0° C. to about 50° C. or 75° C. until the reaction is substantially completed at which time it may be desirable to raise the temperature somewhat to insure complete reaction. Because the reaction is to some extent exothermic, especially with the lower molecular weight reactants, gradual combination of the reactants with agitation is recommended at least in initial runs in order to obtain smooth reactions. External cooling is usually advantageous. When working with the very reactive dialdehyde compounds of this type, optimum conditions comprise gradual addition of the water, mineral acid or aqueous acid to a mixture of the dialdehyde and the trivalent phosphorus ester reactants. However, as will be apparent to those skilled in the art, the exothermic nature of the reaction becomes less of a factor as the molecular weight of the reactants, and particularly the trivalent phosphorus ester (c), is increased.

Examples of dialdehydes that may be used in the process of this invention include the aliphatic and aromatic dialdehydes. Particularly preferred dialdehydes because of cost and availability considerations are the alkane dicarboxaldehydes having from 2 to about 10 carbon atoms in the alkane (alkylene) moieties, and the monocyclic aryl (phenylene) dicarboxaldehydes. They are illustrated by succinaldehyde, isosuccinaldehyde, glutaraldehyde, dimethylmalonaldehyde, ethylmalonaldehyde, methylsuccinaldehyde, isopropylglutaraldehyde, adipaldehyde, pimelaldehyde, suberaldehyde (octanedialdehyde), nonanedialdehyde, propyladipaldehyde, and sebacaldehyde, and the phthalaldehydes, for example, o-phthalaldehyde, isophthalaldehyde, and terephthalaldehyde. Other less preferred dialdehydes which could be used include malealdehyde, fumaraldehyde, citraconaldehyde, itaconaldehyde, mesaconaldehyde, cis- and trans-pentendialdehyde, 1,4-naphthenedicarboxaldehyde, and the mixed alkanearyldialdehydes such as p-[1-(2-formylethyl)] benzaldehyde, 2,4-pyrroledialdehyde, etc.

Reactant (b) used in the process of this invention is either water, a non-oxidizing mineral acid, or a combination of water and the non-oxidizing mineral acid. The non-oxidizing mineral acid is preferably hydrogen chloride or hydrogen bromide. Other useful non-oxidizing mineral acids include acids of sulfur and phosphorus. Acid materials resulting from the combination of water and the mineral acids such as hydrochloric acid, hydrobromic acid, sulfuric acid, phosphoric acid, etc. may also be used. We prefer to use either hydrogen chloride, hydrogen bromide, water or mixtures of these materials as our reactant (b). With the use of hydrogen chloride or hydrogen bromide, the process of this invention provides a side advantage in that there is obtained as by-product a saturated aliphatic chloride or bromide derived from the R ester radical in the trivalent phosphorus ester reactant. These by-products are generally articles of commerce for which numerous uses exist, thus contributing to certain cost recoveries in the process.

Alkyl and haloalkyl phosphite esters are a preferred class of trivalent phosphorus ester reactants (c). Examples of such compounds include trimethyl, triethyl, tripropyl, triisopropyl, tributyl, tripentyl, trihexyl, triheptyl, tris(2-ethylhexyl), trinonyl, tridecyl, triundecyl, and tridodecyl, as well as the mixed alkyl phosphite esters such as methyl diethyl, ethyl dimethyl, ethyl dipropyl, ethyl dihexyl, propyl dioctyl, methyl didodecyl, ethyl propyl butyl, and hexyl octyl dodecyl phosphites of normal and branched chain configurations, and the chloralkyl and bromoalkyl phosphites such as tris (2-chloroethyl), tris (2-chloropropyl), tris(2-bromopropyl), tris(2-bromoethyl), tris(bromochloropropyl), tris(2-chlorobutyl), tris(4-bromohexyl), tris(10,11-dichlorododecyl), tris(dichloropropyl), bis(2-bromoethyl) 2-chloroethyl, bis(2-chloroethyl) 2-chloro-3-bromopropyl, and bis(2-bromopropyl) 2-chlorododecyl phosphites, and the mixed alkyl haloalkyl phosphites such as dimethyl 2-chloroethyl, diethyl 2-bromoethyl, dipropyl 2-chloropropyl, ethyl propyl 2-bromopropyl, hexyl bis(4-chlorooctyl), 2-chloroethyl bis(2-ethylhexyl), and 2-bromoundecyl diundecyl phosphites.

Other useful phosphite esters include the dialkyl phenyl, bis(haloalkyl) phenyl, and alkyl haloalkyl phenyl phosphites, e.g., dimethyl phenyl, diethyl phenyl, dihexyl phenyl, ethyl octyl phenyl, bis(2-chloroethyl) phenyl, bis(2-bromopropyl) phenyl, bis(2-chlorobutyl) phenyl, bis(4-chlorodecyl) phenyl, ethyl 2-chloroethyl phenyl, propyl 2-bromopentyl phenyl, and heptyl 2-chlorononyl 4-chlorophenyl phosphites.

Phosphonite esters having ester radicals similar to the alkyl and haloalkyl described above may also be used; e.g., diethyl ethyl-, dimethyl octyl-, dibutyl phenyl-, diheptyl phenyl-, bis(dichloropropyl) phenyl-, bis(2-chloroethyl) phenyl-, bis(2-bromooctyl) phenyl-, bis(bromochloropropyl) phenyl-, and bis(2-chloro-3-bromopropyl) phenylphosphonites.

Examples of glycols containing pentavalent phosphorus ester groups of this invention and the reactants from which they are obtained are:

1,4-dihydroxy-1,4-butylenebis[bis(2-chloroethyl) phosphonate] obtained from succinaldehyde, hydrogen chloride, and tris(2-chloroethyl) phosphite;

1,3-dihydroxy-1,3-propylenebis[dimethyl phosphonate] from malonaldehyde, hydrogen bromide, and trimethyl phosphite;

1,6-dihydroxy-1,6-hexylenebis[bis(2-bromopropyl) phosphonate] obtained from adipaldehyde, sulfuric acid, and tris(2-bromopropyl) phosphite;

1,5-dihydroxy-1,5-pentylenebis[(2-chloropropyl) phenylphosphinate] obtained from glutaraldehyde, phosphoric acid, and bis(2-chloropropyl) phenylphosphonite;

1,9-dihydroxy-1,9-nonylenebis(dihexyl phosphonate) obtained from nonanedialdehyde, water, and trihexyl phosphite;

$\alpha,\alpha'$-dihydroxy-1,4-phenylenedimethylenebis(dibutyl phosphonate) obtained from terephthalaldehyde, water, and tributyl phosphite;

$\alpha,\alpha'$-dihydroxy-1,3-phenylenedimethylenebis[bis(2-chloroethyl) phosphonate] obtained from isophthalaldehyde, hydrogen chloride, and tris(2-chloroethyl) phosphite; and $\alpha,\alpha'$-dihydroxy-1,4-phenylenedimethylenebis(octyl phenylphosphinate) obtained from terephthalaldehyde, hydrogen bromide, and dioctyl phenylphosphonite.

The process of the present invention may be conducted in the absence of an inert diluent. But the use of diluents may be employed and may be particularly advantageous when working with reactants that give viscous liquids or solid products. Such diluents may be for example, benzene, toluene, dioxane, methylene chloride, ether, or hexane. When the reaction is completed, the diluent may be removed from the product in known manner, for example, by vacuum distillation. The product of the reaction which comprises the pentavalent phosphorus ester containing hydrocarbon diol admixed with the by-product obtained may be used directly for a variety of industrial and agricultural purposes without purification. For example, when hydrogen chloride or hydrogen bromide has been used as the reactant (b), there is obtained as by-product a halogenated hydrocarbon derived from the chlorine or bromine of the reactant (b) and the alkyl or haloalkyl radical of the trivalent phosphorus ester reactant. These halogenated hydrocarbon by-products have some commercial value of themselves and may be left admixed with the product, especially when the product is to be used for example as an additive to gasoline hydrocarbon fuels for internal combustion engines as a pre-ignition inhibiting agent.

The phosphorus ester containing hydrocarbon diols of this invention are stable compounds which are usually liquid materials but may range in physical appearance from liquids to crystalline solids at atmospheric conditions. They are of particular interest as reactants which provide flame-retarding properties to polyethers, polyesters, and polyurethane polymer compositions when such polymer compounds are prepared from the hydrocarbon diol. They also have some utility as hydrocarbon mineral oil based lubricant additives to which they impart extreme pressure enhancing characteristics.

The invention is further illustrated by the following examples.

Example 1

A mixture of 67.0 g. (0.5 mole) of terephthalaldehyde, 182.6 g. (1.1 moles) of redistilled triethyl phosphite and 200 g. of dioxane was treated with 36.4 g. (1.0 mole) of hydrogen chloride in 0.4 hr. with cooling at 24–29°. During the hydrogen chloride addition, the yellow aldehyde gradually disappeared and a large amount of white solid separated The reaction mixture was stirred at room temperature for 0.25 hr., filtered with suction and the solid washed twice with dioxane and twice with ether to give 180.4 g. of α,α'-dihydroxy-α,α'-bis(diethoxyphosphinyl)-p-xylene, 86% yield, M.P. 205–208°. Recrystallization of a 10 g. portion from dimethyl sulfoxide gave 6.1 g. of fine, white crystals, M.P. 216–218°, $P^{31}$ N.M.R.—22.0 p.p.m, molecular weight 431 (theory 410).

Analysis.—Calcd. for $C_{16}H_{28}O_8P_2$: C, 46.85; H, 6.88; P, 15.12; OH, 8.3. Found: C, 46.95; H, 6.79; P, 15.09; OH, 8.10.

Infrared bands, cm.$^{-1}$ | Assignments
--- | ---
3200 | —OH.
2000–1750 | Para substitution.
1610–1500 | C=C (conjugated).
1240–1200 | P=O.
1070–950 | P—O—C.

Example 2

The treatment of 0.5 mole of terephthalaldehyde and 1.2 moles of crude tris(2-chloroethyl) phosphite with hydrogen chloride as in the preceding experiment gave 214 g. (78%) of α,α'-dihydroxy-α,α'-bis(di-2-chloroethoxyphosphinyl)-p-xylene, white solid, M.P. 181–183° after recrystallization from dimethyl sulfoxide.

Analysis.—Calcd. for $C_{16}H_{24}Cl_4O_8P_2$: C, 35.08; H, 4.42; Cl, 25.90; P, 11.30; OH, 6.20. Found: C, 35.02; H, 4.72; Cl, 25.68; P, 11.04; OH, 5.96.

Example 3

A 1-liter flask was charged with 60.3 g. (0.45 mole) of terephthalaldehyde, 254.3 g. (1.0 mole) of di-n-butyl phenylphosphonite and 230 g. of dioxane. Anhydrous hydrogen chloride, 36.4 g. (1.0 mole), was then added below the surface in 0.5 hour with cooling at 26–31°. A white solid began separating after about 30 g. of hydrogen chloride had been added. After being warmed and stirred at 50° for 0.5 hour, the reaction mixture was filtered to give 220 g. of white waxy product. Recrystallization of a portion from dimethyl sulfoxide gave α,α'-dihydroxy-α,α'-bis[(n-butoxy)phenylphosphinyl]-p-xylene, M.P. 204–206° C. $P^{31}$ N.M.R.—36 p.p.m.

Example 4

A 1-liter flask equipped with a stirrer, thermometer, condenser, and a subsurface gas delivery tube was charged with 332 g. (2.0 moles) of triethyl phosphite and 100 g. (1.0 mole) of freshly distilled glutaraldehyde (B.P. 91–94° C./25 mm.). Then hydrogen chloride (73 g., 2 moles) was introduced while cooling the mixture at 20°–30° C. After about one-half of the hydrogen chloride had been added a solid started precipitating from the mixture. Two hundred ml. of anhydrous ether was added to facilitate stirring. The resulting mixture containing a voluminous white precipitate was stirred for an additional hour and then allowed to stand overnight. The solid was separated by filtration and washed with dry ether. After drying to constant weight, the solid weighed 220.6 g. and melted at 104–116° C. Recrystallization of the crude 1,5-dihydroxy-1,5-bis(diethoxyphosphinyl)pentane from chloroform-ether mixture gave 186.9 g. (49.6% yield) of the more pure product having a melting point of 114–122° C. (M.P. range attributed to diasteroisomeric mixture), $P^{31}$ N.M.R.—259 p.p.m. The product analyzed as follows:

Calc'd for $C_{13}H_{30}O_8P_2$: C, 41.49%; H, 8.04%; P, 16.46%. Found: C, 41.18%; H, 8.05%; P, 16.47%.

Also, infrared analyses of the product showed the following characteristics:

Cm.$^{-1}$ | Function assignments
--- | ---
3250 | OH bonded alcohol.
1225 | P=O.
1155 | P—O—C.
1100–960 | P—O—C.

These functions are consistent with the structure,

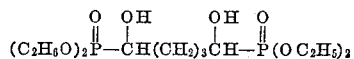

We claim:

1. Phosphorus ester containing hydrocarbon diols of the formula

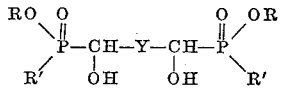

wherein each R is selected from the group consisting of alkyl having from 1 to about 12 carbon atoms, chloroalkyl having from 2 to about 12 carbon atoms, and bromoalkyl having from 2 to about 12 carbon atoms, each R' is selected from the group consisting of alkyl having from 1 to about 12 carbon atoms, alkyloxy having from 1 to about 12 carbon atoms, chloroalkyloxy having from 2 to about 12 carbon atoms, bromoalkyloxy having from 2 to about 12 carbon atoms, phenyl, and phenyloxy, and Y is bivalent and is selected from the group consisting of alkylene having from 2 to about 10 carbon atoms, and phenylene.

2. Compounds as described in claim 1 wherein R is alkyl having from 1 to about 12 carbon atoms, R' is alkyloxy having from 1 to about 12 carbon atoms, and Y is alkylene having from 2 to about 10 carbon atoms.

3. A compound as described in claim 2 wherein R is ethyl, R' is ethyloxy, and Y is pentylene.

4. Compounds as described in claim 1 wherein R is alkyl having from 1 to about 12 carbon atoms, R' is phenyl and Y is phenylene.

5. A compound as described in claim 4 wherein R is butyl, R' is phenyl and Y is phenylene.

6. Compounds as described in claim 1 wherein R is chloroalkyl having from 1 to about 12 carbon atoms, R' is chloroalkyloxy having from 2 to about 12 carbon atoms, and Y is phenylene.

7. A compound as described in claim 6 wherein R is 2-chloropropyl, R' is 2-chloropropyloxy, and Y is phenylene.

8. Compounds as described in claim 1 wherein R is alkyl having from 1 to about 12 carbon atoms, R' is alkyloxy having from 1 to about 12 carbon atoms, and Y is phenylene.

9. Compounds as described in claim 8 wherein R is ethyl, R' is ethyloxy, and Y is phenylene.

10. A process which comprises combining (a) a dialdehyde with a reactant of the group consisting of (b) a member of the group consisting of water, a non-oxidizing mineral acid and acids resulting from a mixture of water and the non-oxidizing mineral acid, and (c) a trivalent phosphorus ester, with the proviso that the dialdehyde (a) has combined therewith the other member of said group of reactants (b) and (c), said combination being conducted at a temperature of from about −25° C. to about 125 C., said dialdehyde having the formula

OHC—Y—CHO wherein Y is selected from the group consisting of alkylene having from 2 to about 10 carbon atoms, and phenylene, and said trivalent phosphorus ester having the formula (RO)₂PR' wherein R is selected from the group consisting of alkyl having from 1 to about 12 carbon atoms, chloroalkyl, and bromoalkyl having from 2 to about 12 carbon atoms in each of such moieties, and R' is selected from the group consisting of alkyl and alkyloxy having from 1 to about 12 carbon atoms in each of such moieties, chloroalkyloxy and bromoalkyloxy having from 2 to about 12 carbon atoms in each of such moieties, phenyl and phenyloxy to obtain as product of the resulting reaction a pentavalent phosphorus ester containing hydrocarbon diol having 2 phosphorus ester moieties per molecule in which each pentavalent phosphorus derived from the trivalent phosphorus ester reactant (c) and an hydroxyl group are bonded to the same carbon atom.

11. A process as described in claim 10 wherein Y is alkylene having from 2 to about 10 carbon atoms, reactant (b) is a non-oxidizing mineral acid and in the trivalent phosphorus ester reactant (c) R is alkyl having from 1 to about 12 carbon atoms and R' is alkyloxy having from 2 to about 12 carbon atoms.

12. A process as described in claim 11 wherein Y is pentylene, the non-oxidizing mineral acid is hydrogen chloride, and in the trivalent phosphorus ester reactant (c) R is ethyl, and R' is ethyloxy.

13. A process as described in claim 10 wherein Y is phenylene, reactant (b) is a non-oxidizing mineral acid, and in the trivalent phosphorus ester reactant (c) R is alkyl having from 1 to about 12 carbon atoms and R' is phenyl.

14. Process as described in claim 13 wherein Y is phenylene, the non-oxidizing mineral acid is hydrogen chloride, and in the trivalent phosphorus ester reactant (c) R is butyl, and R' is phenyl.

15. A process as described in claim 10 wherein the dialdehyde reactant (a) Y is phenylene, reactant (b) is a non-oxidizing mineral acid and in the trivalent phosphorus reactant (c) R is chloroalkyl having from 1 to about 12 carobn atoms, and R' is chloroalkyloxy having from 2 to about 12 carbon atoms.

16. The process as described in claim 15 wherein in the dialdehyde reactant (a) Y is phenylene, the non-oxidizing mineral acid is hydrogen chloride, and in the trivalent phosphorus ester reactant (c) R is 2-chloropropyl, and R' is 2-chloropropyloxy.

17. A process as described in claim 10 wherein in the dialdehyde reactant (a) Y is phenylene, the reactant (b) is a non-oxidizing mineral acid and in the trivalent phosphorus ester reactant (c) R is alkyl having from 1 to about 12 carbon atoms, and R' is alkyloxy having from 1 to about 12 carbon atoms.

18. A process as described in claim 17 wherein in the dialdehyde reactant (a) Y is phenylene, the non-oxidizing mineral acid is hydrogen chloride, and in the trivalent phosphorus ester reactant (c) R is ethyl, and R' is ethyloxy.

References Cited
UNITED STATES PATENTS 2,593,213  4/1952  Stiles _____ 260—932 X CHARLES B. PARKER, *Primary Examiner.*

B. BILLIAN, A. H. SUTTO, *Assistant Examiners.*